United States Patent
Hazlebeck et al.

(10) Patent No.: US 6,773,581 B2
(45) Date of Patent: Aug. 10, 2004

(54) SYSTEM AND METHOD FOR SOLIDS TRANSPORT IN HYDROTHERMAL PROCESSES

(75) Inventors: David A. Hazlebeck, El Cajon, CA (US); Michael H. Spritzer, San Diego, CA (US); Kevin W. Downey, San Diego, CA (US); Martin R. Martinez, San Marcos, CA (US); Toshisuke Isoya, Hatano (JP); Kunitoshi Suzuki, Chigasaki (JP); Satoshi Nakayama, Tokyo (JP)

(73) Assignee: General Atomics, San Diego, CA (US)

(*) Notice: Subject to any disclaimer, the term of this patent is extended or adjusted under 35 U.S.C. 154(b) by 49 days.

(21) Appl. No.: 09/982,986

(22) Filed: Oct. 18, 2001

(65) Prior Publication Data

US 2003/0075514 A1 Apr. 24, 2003

(51) Int. Cl.⁷ .................................................. C02F 1/72
(52) U.S. Cl. ..................... 210/178; 15/93.1; 210/205; 210/219; 422/184.1; 422/200; 422/224
(58) Field of Search ........................ 15/93.1; 210/177, 210/178, 179, 195.1, 205, 208, 219; 422/184.1, 200, 224

(56) References Cited

U.S. PATENT DOCUMENTS

| | | | |
|---|---|---|---|
| 3,529,939 A | * | 9/1970 | Mason .......................... 422/273 |
| 3,592,395 A | * | 7/1971 | Lockwood et al. ............. 241/18 |
| 3,964,874 A | * | 6/1976 | Maruko et al. ............... 422/135 |
| 4,543,190 A | | 9/1985 | Modell |
| 4,822,497 A | | 4/1989 | Hong et al. |
| 5,100,560 A | | 3/1992 | Huang |
| 5,200,093 A | | 4/1993 | Barner et al. |
| 5,252,224 A | | 10/1993 | Modell et al. |
| 5,358,645 A | | 10/1994 | Hong et al. |
| 5,387,398 A | | 2/1995 | Mueggenburg et al. |
| 5,427,764 A | | 6/1995 | Barber |
| 5,437,798 A | | 8/1995 | LaRoche et al. |
| 5,492,634 A | | 2/1996 | Hong et al. |
| 5,501,799 A | | 3/1996 | Bond et al. |
| 5,527,471 A | | 6/1996 | Hong et al. |
| 5,543,057 A | | 8/1996 | Whiting et al. |
| 5,545,472 A | | 8/1996 | Koubek et al. |
| 5,552,039 A | | 9/1996 | McBrayer, Jr. et al. |
| 5,558,783 A | | 9/1996 | McGuinness |
| 5,560,822 A | | 10/1996 | Bond et al. |
| 5,560,823 A | | 10/1996 | Whiting |
| 5,560,872 A | | 10/1996 | Rahman et al. |
| 5,571,423 A | | 11/1996 | Daman |
| 5,571,424 A | | 11/1996 | Ahluwalia |
| 5,591,415 A | | 1/1997 | Dassel et al. |
| 5,620,606 A | | 4/1997 | McBrayer, Jr. et al. |
| 5,667,698 A | | 9/1997 | Whiting |
| 5,670,040 A | | 9/1997 | Ahluwalia |
| 5,674,405 A | | 10/1997 | Bourhis et al. |
| 6,054,057 A | * | 4/2000 | Hazlebeck et al. .......... 210/761 |
| 6,365,116 B1 | * | 4/2002 | Barham et al. ............. 423/121 |
| 6,495,110 B1 | * | 12/2002 | Higo et al. ................. 422/201 |
| 6,544,482 B1 | * | 4/2003 | Inori .......................... 422/168 |

* cited by examiner

Primary Examiner—Peter A. Hruskoci
(74) Attorney, Agent, or Firm—Nydegger & Associates

(57) ABSTRACT

A system and method for performing hydrothermal treatment includes a scraper formed as a hollow cylinder. The scraper is positioned in the reactor vessel with the scraper axis substantially co-linear with the longitudinal axis of the cylindrical reactor vessel. A mechanism is provided to rotate the scraper about the longitudinal axis of the reactor vessel. One or more elongated scraper bars are positioned inside the reactor vessel between the scraper and the longitudinal axis of the reactor vessel. Each scraper bar may be held stationary with respect to the reactor vessel, or each scraper bar may rotated relative to an axis passing through the scraper bar to remove any solids that have accumulated on the scraper or on the scraper bar. To prevent accumulation of precipitating solids on the scraper bar itself, each scraper bar may have internal cooling channels or the capability of releasing a purging fluid.

12 Claims, 5 Drawing Sheets

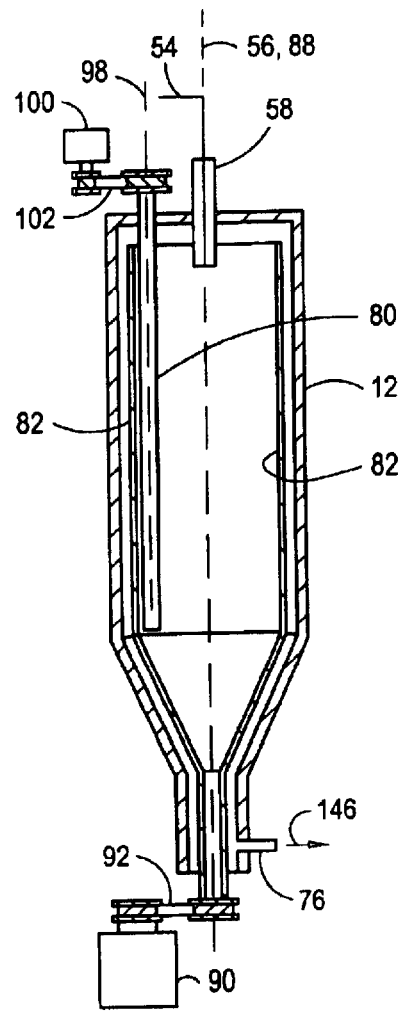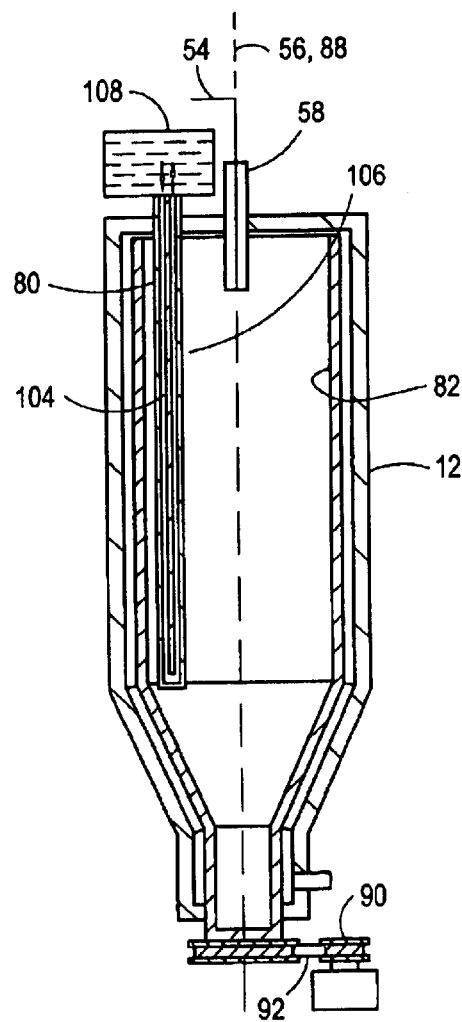
Fig. 5
Fig. 6

SYSTEM AND METHOD FOR SOLIDS TRANSPORT IN HYDROTHERMAL PROCESSES

FIELD OF THE INVENTION

The present invention pertains generally to methods and systems for using a hydrothermal reactor for the purposes of either waste destruction, energy generation, or production of chemicals. More specifically, the present invention pertains to methods and systems for the hydrothermal treatment of organics in a reactor when the organics contain or generate inorganic compounds such as salts or oxides during oxidation. The present invention is particularly, but not exclusively, useful as a method and system for using a reactor to accomplish the hydrothermal treatment of materials in a way which avoids the unwanted build-up of inorganic compounds in the reactor.

BACKGROUND OF THE INVENTION

The present invention relates generally to the conversion of a broad spectrum of materials and especially to a method for the hydrothermal treatment of organics. Of particular importance to the present invention are organics which contain inorganic compounds such as salts or oxides or which will generate these inorganic compounds under supercritical temperature and pressure conditions, or at supercritical temperatures and elevated, yet subcritical pressures.

The process of wet oxidation has been used for the treatment of aqueous streams for over thirty (30) years. In general, a wet oxidation process involves the addition of an oxidizing agent, typically air or oxygen, to an aqueous stream at elevated temperatures and pressures. The resultant "combustion" of organic or inorganic oxidizable materials occurs directly within the aqueous phase.

A wet oxidation process is typically characterized by operating pressures in the range of 30 bar to 250 bar (440 psia–3,630 psia) and operating temperatures in a range of one hundred fifty degrees Celsius to three hundred seventy degrees Celsius (150° C.–370° C.). Under these conditions, liquid and gas phases coexist for aqueous media. Since gas phase oxidation is quite slow at these temperatures, the reaction is primarily carried out in the liquid phase. To do this, the reactor operating pressure is typically maintained at or above the saturated water vapor pressure. This causes at least part of the water to be present in a liquid form. Even in the liquid phase, however, reaction times for substantial oxidation are on the order of one (1) hour. In many applications, reaction times of this length are unacceptable.

In addition to unacceptably long reaction times, the utility of conventional wet oxidation is limited by several factors. These include: the degree of oxidation attainable; an inability to adequately oxidize refractory compounds; and the lack of usefulness for power recovery due to the low temperature of the process. For these reasons, there has been considerable interest in extending wet oxidation to higher temperatures and pressures. For example, U.S. Pat. No. 2,944,396, which issued Jul. 12, 1960 to Barton et al., discloses a process wherein an additional second oxidation stage is accomplished after wet oxidation. In the Barton process, unoxidized volatile combustibles which accumulate in the vapor phase of the first stage wet oxidation reactor are sent to complete their oxidation in the second stage. This second stage is operated at temperatures above the critical temperature of water, about three hundred seventy four degrees Celsius (374° C.).

A significant development in the field occurred with the issuance of U.S. Pat. No. 4,338,199, entitled "Processing Methods for the Oxidation of Organics In Supercritical Water," which issued to Modell on Jul. 6, 1982. Specifically, the Modell '199 patent discloses a wet oxidation process which has now come to be widely known as supercritical water oxidation ("SCWO"). As the acronym SCWO implies, in some implementations of the SCWO process, oxidation occurs essentially entirely at conditions which are supercritical in both temperature (greater than 374° C.) and pressure (greater than about 3,200 psi or 220 bar). Importantly, SCWO has been shown to give rapid and complete oxidation of virtually any organic compound in a matter of seconds at temperatures between five hundred degrees and six hundred fifty degrees Celsius (500° C.–650° C.) and at pressures around 250 bar. During this oxidation, carbon and hydrogen in the oxidized material form the conventional combustion products, namely carbon dioxide ("$CO_2$") and water. When chlorinated hydrocarbons are involved, however, they give rise to hydrochloric acid ("HCl"), which will react with available cations to form chloride salts. Due to the corrosive effect of HCl, it may be necessary to intentionally add alkali to the reactor to avoid high concentrations of hydrochloric acid in the reactor. This is especially important in the cooldown equipment following the reactor. In a different reaction, when sulfur oxidation is involved, the final product in SCWO is a sulfate anion. This is in contrast to standard, dry combustion, in which gaseous sulfur dioxide ("$SO_2$") is formed and must generally be treated before being released into the atmosphere. As in the case of chloride, alkali may be intentionally added to avoid high concentrations of corrosive sulfuric acid. Similarly, the product of phosphorus oxidation is a phosphate anion.

At typical SCWO reactor conditions, densities are around 0.1 g/cc. Thus, water molecules are considerably farther apart than they are in water at standard temperatures and pressures (STP). Also, hydrogen bonding, a short-range phenomenon, is almost entirely disrupted, and the water molecules lose the ordering that is responsible for many of the characteristic properties of water at STP. In particular, the solubility behavior of water under SCWO conditions is closer to that of high pressure steam than to water at STP. Further, at typical SCWO conditions, smaller polar and nonpolar organic compounds, having relatively high volatility, will exist as vapors and are completely miscible with supercritical water. It also happens that gases such as nitrogen ($N_2$), oxygen ($O_2$), and carbon dioxide ($CO_2$) show similar complete miscibility in supercritical water. The loss of bulk polarity in supercritical water also significantly decreases the solubility of salts. The lack of solubility of salts in supercritical water causes the salts to precipitate as solids and deposit on process surfaces causing fouling of heat transfer surfaces and blockage of the process flow.

A process related to SCWO known as supercritical temperature water oxidation ("STWO") can provide similar oxidation effectiveness for certain feedstocks but at lower pressure. This process has been described in U.S. Pat. No. 5,106,513, entitled "Process for Oxidation of Materials in Water at Supercritical Temperatures and Subcritical Pressures," which issued to Hong on Apr. 21, 1992, and utilizes temperatures in the range of six hundred degrees Celsius (600° C.) and pressures between 25 bar to 220 bar. On the other hand, for the treatment of some feedstocks, the combination of temperatures in the range of four hundred degrees Celsius to five hundred degrees Celsius (400° C.–500° C.) and pressures of up to 1,000 bar (15,000 psi) have proven useful to keep certain inorganic materials from precipitating out of solution (Buelow, S. J., "Reduction of Nitrate Salts Under Hydrothermal Conditions," Proceedings of the 12th International Conference on the Properties of Water and Steam, ASME, Orlando, Fla., September, 1994).

The various processes for oxidation in an aqueous matrix (e.g. SCWO and STWO) are referred to collectively as hydrothermal oxidation, if carried out at temperatures between about three hundred seventy-four degrees Celsius to eight hundred degrees Celsius (374° C.–800° C.), and pressures between about 25 bar to 1,000 bar. Similar considerations of reaction rate, solids handling, and corrosion also apply to the related process of hydrothermal reforming, in which an oxidizer is largely or entirely excluded from the system in order to form products which are not fully oxidized. The processes of hydrothermal oxidation and hydrothermal reforming will hereinafter be jointly referred to as "hydrothermal treatment."

A key issue pertaining to hydrothermal treatment processes is the means by which feed streams containing or generating sticky solids are handled. It is well-known that such feed streams can result in the accumulation of solids that will eventually plug the process equipment. Sticky solids are generally comprised of salts, such as halides, sulfates, carbonates, and phosphates. One of the earliest designs for handling such solids on a continuous basis is disclosed in U.S. Pat. No. 4,822,497, entitled "Method for Solids Separation in a Wet Oxidation Type Process," which issued to Hong et al. In general, and in line with the disclosure of the '497 patent, the reaction in a hydrothermal treatment process is carried out in a vertically oriented vessel reactor. Solids form in the reactor as the reaction proceeds and these solids are projected to fall into a cooler brine zone that is maintained at the bottom of the reactor. In the brine zone, the sticky solids re-dissolve and may be continually drawn off in the brine from the reactor. Solids separation from the process stream is achieved because only the fraction of the process stream that is necessary for solids dissolution and transport is withdrawn as brine. The balance of the process stream, which is frequently the largest portion, is caused to reverse flow in an upward direction within the reactor. The process stream, less the solids, is then withdrawn from the top section of the reactor. By this means, it becomes possible to recover a hot, nearly solids-free stream from the process. To minimize entrainment of solid particles in the upward flow within the reactor, the velocity is kept to a low value by using a large cross-section reactor vessel. Experience has shown that while a large fraction of the sticky solids is transferred into the brine zone, a certain portion also adheres to the vessel walls, eventually necessitating an online or off-line cleaning procedure.

Heretofore, mechanical scrapers which are movable relative to the vessel wall during the hydrothermal process have been suggested to reduce the buildup of solids on the vessel wall. For example, U.S. Pat. No. 5,100,560, entitled "Apparatus and Method for Supercritical Water Oxidation," which issued to Huang discloses a scraper that is rotatable about the axis of the reactor vessel for dislodging precipitated solids from the wall of a reactor vessel. Unfortunately, simple rotatable scrapers have enjoyed limited success to date. One reason for this lack of success is that solids often buildup on the scrapers preventing the scrapers from rotating and resulting in the reactor vessel becoming plugged.

In light of the above, it is an object of the present invention to provide a system and method for hydrothermal treatment which continuously and reliably handles waste streams containing or generating significant quantities of sticky solids while minimizing the need to take the reactor vessel off-line for cleanout. Another object of the present invention is to provide a system and method for accomplishing hydrothermal treatment in a continuous online process wherein the accumulation of solids on the vessel walls, scraper and scraper bars is minimized. Still another object of the present invention is to provide a system and method for accomplishing hydrothermal treatment which use scraper bars that include a mechanism for preventing solids from initially accumulating on the scraper bars. Yet another object of the present invention is to provide a system and method for accomplishing hydrothermal treatment which is easy to implement, simple to use, and cost effective.

SUMMARY OF THE PREFERRED EMBODIMENTS

In accordance with the present invention, a system for performing hydrothermal treatment at temperatures in a range from above three hundred seventy-four degrees Celsius (374° C.) to about eight hundred degrees Celsius (800° C.) and at pressures above about 25 bars, includes a substantially cylindrically shaped reactor vessel which forms a reactor chamber. The cylindrical vessel is formed with a wall having an inner surface and defines a longitudinal axis. Generally, the feed material is introduced into one end of the cylindrical reactor vessel and the reaction products are withdrawn from the other end of the cylindrical reactor vessel.

For the present invention, one or more elongated scraper bars are positioned in the reactor chamber substantially parallel to the longitudinal axis of the reactor vessel. An optional scraper may be used in conjunction with the scraper bars. For the present invention, the scraper is a hollow cylinder formed with an inside surface and an outside surface and defining a scraper axis. The scraper is positioned in the reactor vessel with the scraper axis substantially co-linear with the longitudinal axis of the cylindrical reactor vessel. As such, the outside surface of the scraper is positioned adjacent to the inner surface of the reactor vessel wall. The scraper may be solid or the scraper may contain holes which extend from the inside surface of the scraper to the outside surface of the scraper. A mechanism is provided to rotate the scraper about the longitudinal axis of the reactor vessel. The rotation of the scraper about the longitudinal axis results in a relative movement between the outside surface of the scraper and the inner surface of the reactor vessel wall allowing the scraper to dislodge any material that builds up on the inner surface of the reactor vessel wall.

At least one scraper bar is positioned inside the reactor vessel between the scraper and the longitudinal axis. Each scraper bar is positioned adjacent to the inside surface of the scraper. In one embodiment of the present invention, each scraper bar is positioned adjacent to the rotating scraper and held stationary with respect to the reactor vessel. Each scraper bar is generally elongated and formed with a characteristic shape normal to the direction of elongation. For example, a scraper bar may be formed with a circular, triangular or blade shape normal to the direction of elongation. Preferably, the scraper bar is oriented in the reactor chamber with the direction of elongation parallel to the longitudinal axis of the reactor vessel. In another embodiment, the scraper bar is positioned adjacent to the scraper and is rotatable about a scraper bar axis that passes through the scraper bar. Preferably, the scraper bar axis is substantially parallel to the direction of elongation of the scraper bar.

In yet another embodiment of the present invention, at least two scraper bars are positioned in the reactor chamber adjacent to the rotatable scraper. In this embodiment, each scraper bar is capable of nesting with another scraper bar. Preferably, each scraper bar is elongated and is formed with a leading edge and a trailing edge. As the scraper rotates, each point on the inside surface of the scraper first passes by the leading edge of the scraper bar and, subsequently passes by the trailing edge of the scraper bar. A separate arm is provided for each scraper bar. Each arm extends radially from a first end that is positioned on the longitudinal axis of the reactor chamber to a second end that is attached to the scraper bar to thereby allow each scraper bar to be independently rotated about the longitudinal axis of the reactor chamber. Further, each scraper bar is oriented at an angle, $\alpha$, relative to it's attached arm to thereby cause the distance between the leading edge of the scraper bar and the inside surface of the scraper to be less than the distance between the trailing edge of the scraper bar and the inside surface of the scraper. A mechanism is provided to independently rotate each arm about the longitudinal axis of the reactor vessel to thereby allow for relative movement between adjacent scraper bars. Specifically, the trailing edge of one scraper bar can be passed by the leading edge of a second scraper bar to dislodge any solids that have accumulated on either scraper bar.

In still another embodiment of the present invention, scraper bars that are formed with internal cooling channels are positioned adjacent to a rotatable scraper. A mechanism is provided to circulate a coolant through the internal cooling channels, and thereby cool each scraper bar and the fluid that immediately surrounds each scraper bar. When the temperature of the fluid that surrounds each scraper bar is maintained below a critical temperature, inorganic material present in the fluid will not precipitate, and conversely, any precipitated solids will dissolve upon contact with the cooler fluid. In this manner, solids will be prevented from initially accumulating on the scraper bars.

In yet another embodiment of the present invention, scraper bars that are formed with purge holes located on the exterior surface of each scraper bar are positioned adjacent to a rotatable scraper. Internal fluid channels are provided within each scraper bar in fluid communication with the purge holes. A mechanism is provided to pass a purging fluid through the internal fluid channels for release into the reactor chamber through the purge holes. The purge holes are sized and configured to provide the exterior surface of each scraper bar with a jacket of purging fluid thereby preventing inorganic material from accumulating on the scraper bars.

In still another embodiment, a scraper is not used, and one or more scraper bars is positioned in the reactor chamber adjacent to the inner surface of the reactor vessel wall. A mechanism is provided to rotate the scraper bars about the longitudinal axis of the reactor vessel, thereby causing the scraper bars to move relative to the wall of the reactor vessel. In this manner, scraper bars similar to the nesting scrapper bars described above can be used without a rotatable scraper. In this embodiment, a mechanism to rotate the scraper bars as a group about the longitudinal axis is provided for scraping the inner wall of the reactor vessel. Additionally, a mechanism is provided for independently rotating each scraper bar relative to adjacent scraper bars, to allow the removal of solids buildup from the scraper bars.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5 is a schematic cross-sectional representation for an embodiment of the present invention having a scraper bar that is rotatable about a scraper bar axis that passes through the scraper bar and is substantially parallel to the longitudinal axis of the reactor vessel;

FIG. 6 is a schematic cross-sectional representation for an embodiment of the present invention having a scraper bar formed with an internal cooling channel;

DESCRIPTION OF THE PREFERRED EMBODIMENT

Figure 1:
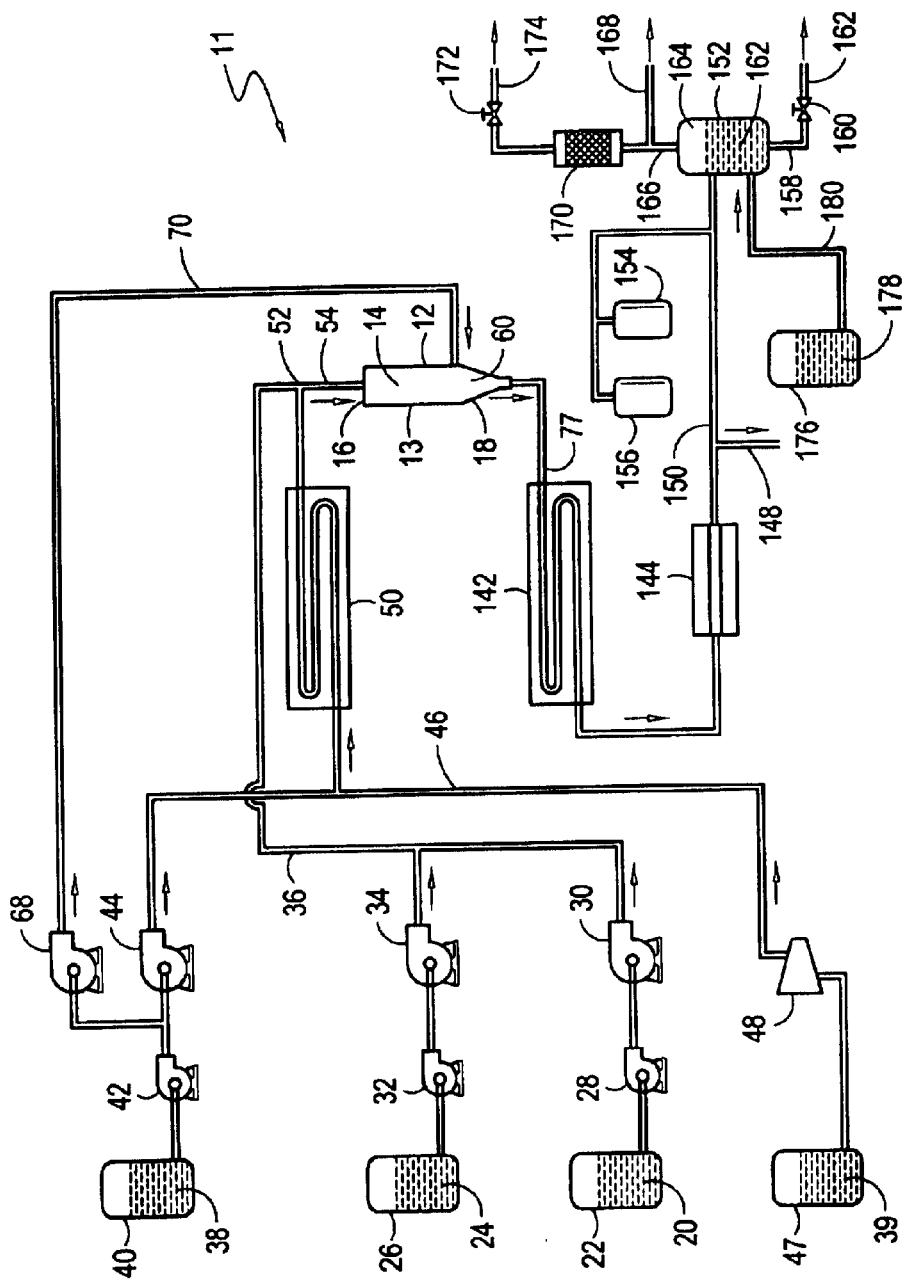
FIG. 1 is a schematic diagram of the components of a system for hydrothermal treatment in accordance with the present invention.

Referring initially to FIG. 1, a hydrothermal treatment system in accordance with the present invention is shown schematically and is generally designated 11. As shown, the system 11 includes a reactor vessel 12 formed with a wall 13 which surrounds a reactor chamber 14. It is also shown that the reactor vessel 12 has an end 16 and an end 18. It is to be appreciated that the vessel 12 can be oriented vertically, horizontally or somewhere therebetween.

The feed material to reactor vessel 12 of the system 11 can, in certain embodiments, include several separate identifiable constituents. These are: (a) the reactant to be processed; (b) an auxiliary fuel, if necessary to sustain reaction in the reactor chamber 14; (c) water; and (d) oxidizer(s). More specifically, FIG. 1 shows that the reactant 20 which is to be processed is initially held in a holding tank 22. As contemplated for the present invention, the reactant 20 can consist of organic material, inorganics, sludge, soil, neutralizing agents, salt-forming agents, minerals, and/or combustible material. Further, particulates capable of entering and exiting the reactor vessel 12 can be added to the reactant 20 to remove salt solids from the reactor vessel 12. These particulates can be inert materials such as sand, silica, soil, titanium dioxide, clay, metal, or ceramic. Also, catalyzing materials such as zeolites, heavy metal oxides or noble metals may be used. In either case, the particulates can be added to the reactor vessel 12 thereby allowing inorganic precipitates to adhere to the surface of the particulate. The coated particulate may then be removed from the reactor vessel 12. Also, as indicated in FIG. 1, it may be necessary to combine the reactant 20 with an auxiliary fuel 24, such as ethanol, which can be initially held in a holding tank 26.

FIG. 1 shows that both the reactant 20 and the auxiliary fuel 24, if used, are pressurized before being introduced into the reactor chamber 14. Specifically, a transfer pump 28 and high pressure pump 30 are used to pressurize the reactant 20. Similarly, a transfer pump 32 and a high pressure pump 34 are used to pressurize the auxiliary fuel 24. As shown in the schematic of system 11 in FIG. 1, the pressurized reactant 20 and auxiliary fuel 24 are combined in line 36 and transferred to the end 16 of the reactor chamber 14. It is to be noted that while the reactant 20 and auxiliary fuel 24 are respectively pressurized by high pressure pumps 30 and 34 to pressures above about 25 bar, they are not necessarily raised in temperature prior to being introduced into the reactor chamber 14. Thus, as intended for the system 11, the reactant 20 can be introduced into the reactor chamber 14 at ambient temperatures.

In addition to the reactant 20 and auxiliary fuel 24, the feed material to reactor chamber 14 can also include pressurized water 38 and a pressurized oxidizer 39. Specifically, water 38 is drawn from holding tank 40 by transfer pump 42 and is thereafter pressurized by high pressure pump 44 before it is passed into line 46. At the same time, an oxidizer 39 such as air, may be drawn from holding tank 47, pressurized by a compressor 48, and passed into the line 46. For purposes of the present invention, the oxidizer 39 to be used, as an alternative to air, can be pure liquid or gaseous oxygen, enriched air, hydrogen peroxide, nitric acid, nitrous acid, nitrate, and nitrite. Alternatively, a substoichiometric oxidizer 39 can be used for applications in which partial oxidation or non-oxidation of the reactant 20 is desired. In any event, at this point the pressurized water 38 and compressed air (oxidizer 39) are mixed and introduced into a preheater 50. As contemplated by the present invention, the heating of the pressurized water/air mixture in preheater 50 can be accomplished in several ways. For example, this preheat may be accomplished by a regenerative heat exchange with a hot reaction stream from reactor chamber 14. The preheat can also be accomplished by an external source, such as electricity, or a fired heater, or a combination of these. External heat sources must be used for preheater 50 when a cold startup of the system 11 is required. On the other hand, it should also be noted that for reactant 20 which has sufficient inherent heating value by itself, the preheater 50 may be shut down once a steady state operation of the system 11 has been achieved.

As the air/water mixture leaves the preheater 50, it is mixed with the reactant 20 and auxiliary fuel 24 from the line 36. This mixing occurs at the junction 52, and the feed material, including the combination of reactant 20, auxiliary fuel 24, water 38, and compressed air (oxidizer 39) is then introduced into the reactor chamber 14 via a duct 54. As will be appreciated by the skilled artisan, an alternative for the system 11 is to use separate ducts for introducing one or more of the streams which make up the feed material into the reactor chamber 14. If so, one duct could be used for the introduction of the reactant 20 and auxiliary fuel 24, and another duct would be used for the introduction of water 38 and an oxidizer 39. Similarly, a separate duct could be used for the reactant 20, the auxiliary fuel 24, the water 38, and the oxidizer 39. Further, depending upon the particular reactant 20, it may be important to use a high shear mixer 51 (see FIG. 2) at the junction 52 to mix the feed/fuel stream from line 36 with the water/oxidizer stream from the preheater 50. For example, if the reactant 20 is largely water insoluble, high shear mixing is desirable to ensure sufficient mixing of combustible materials and high pressure oxidizer 39.

Figure 2:
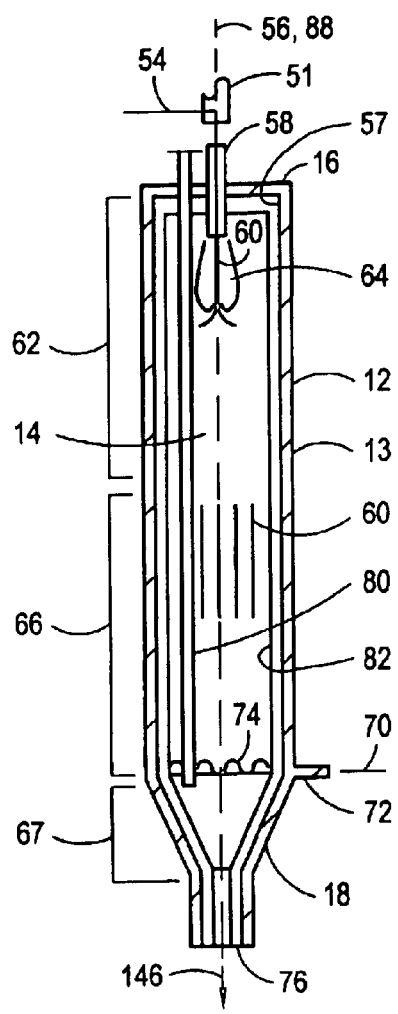
FIG. 2 is a schematic cross-sectional representation of a downflow reactor including a scraper and scraper bar in accordance with the present invention.

Referring now to FIG. 2, a representative vessel 12 and reactor chamber 14 are shown. Specifically, the vessel 12 shown in FIG. 2 is representative of a downflow reactor as disclosed in U.S. Pat. No. 6,054,057, entitled "Downflow Hydrothermal Treatment," which issued to Hazlebeck et al. and is assigned to the same assignee as the present invention. It is to be appreciated that other reactor vessel configurations known in the pertinent art such as a reversible reactor, can be substituted in the present invention as long as the wall 13 of the reactor vessel 12 is substantially cylindrical. As shown in FIG. 2, the vessel 12 generally defines a longitudinal axis 56 and is formed with a wall 13 having an inner surface 57. The inner surface 57 can include a corrosion resistant liner. Suitable materials for the corrosion resistant liner include titanium, platinum, iridium, titania, and zirconia. For the case of a downflow vessel, the longitudinal axis 56 of vessel 12 is vertically oriented with the end 16 directly above the end 18. With this orientation, all of the material that is to be introduced into the reactor chamber 14 through the duct 54 is passed through a nozzle 58. For the downflow vessel, the nozzle 58 introduces a reaction stream 60 into the reactor chamber 14 of the vessel 12 in a direction which is substantially along the axis 56. The nozzle 58 can introduce a straight single jet of the stream 60 or the nozzle 58 can consist of a plurality of nozzles 58 with their respective streams 60 introduced as jets which are inclined toward the axis 56. With this inclination, the streams 60 are directed slightly toward each other for collision with each other.

For the representative downflow reactor vessel, it is desirable that the feed material from nozzle 58 be directed so as not to directly impinge on the wall 13 of the reactor chamber 14. In this way, build up of solid materials on the inner surface 57 of the wall 13 can be minimized. The reaction stream 60 is introduced into the upper portion of the reactor chamber 14 where it is subjected to vigorous back-mixing. Specifically, fluid flow in this back-mixing section 62 is characterized by a turbulence in the reaction stream 60 that results from entraining shear forces and eddies 64 which are set up as the feed material enters into the reactor chamber 14. The feed material is thus rapidly brought above the supercritical temperature of three hundred seventy-four degrees Celsius (374° C.) and rapid reaction commences. Further, while the downflow reactor avoids direct impingement of the reaction stream 60 onto the inner surface 57, heat transfer from the wall 13 of the reactor vessel 12 in the back-mixing section 62 can assist in the propagation of the reaction in the reactor chamber 14.

For the representative downflow vessel 12, a plug flow section 66 is located below a back-mixing section 62 in reactor chamber 14. This plug flow section 66 is characterized by the fact that there is no large scale back-mixing of the reaction stream 60 in this lower portion of the reactor chamber 14. The flow of the reaction stream 60 in the plug flow section 66, however, does exhibit local turbulent mixing. In certain applications, it may be advantageous to provide a filtering device (not shown) below the plug flow section 66. Such a device is useful for trapping low levels of sticky solids or for retaining particulates within the reactor until they have been completely reacted.

The system 11 can also include a quenching section 67 as shown in FIG. 2 to cool the effluent stream. It may be desirable to quench the effluent stream for a number of reasons, including to re-dissolve any sticky solids that may have developed during the reaction, to allow the use of the lesser materials outside the reactor, and/or to adjust the pH of the effluent stream. Returning to FIG. 1, for the moment, it can be seen that a high pressure pump 68 is positioned to take water 38 from holding tank 40 and pass it along via line 70 to an input duct 72 (See FIG. 2) near the end 18 of the reactor chamber 14. The water 38 injected through duct 72 is used for quenching the reaction stream 60 in the quenching section 67. Specifically, the quenching fluid that is introduced through duct 72 mixes with the reaction stream 60 and re-dissolves any sticky solids which developed during reaction in the reactor chamber 14. This quenching occurs below the quench fluid level 74, but above the exit port 76, so that the reaction stream 60 can pass through exit port 76 and into the line 77 without causing plugging or fouling of the exit port 76.

It will be appreciated by the skilled artisan that fluids such as high pressure gas, rather than water, can be used as a quenching medium. Also, it will be appreciated that water from an external source, or relatively dirty water (e.g., sea water), or cool, recycled reaction stream 60 can be used as a quenching medium. These options would help to reduce the amount of clean quench water needed by the system 11. Additionally, it should be appreciated that the cooling fluid should be relatively cool when compared to the reaction stream 60 to provide the quenching medium. Stated another way, the cooling fluid need only be cooler than the reaction stream 60 to cool the reaction stream 60.

Further, it is contemplated by the present invention that the quenching duct 72 can be oriented to direct the quenching medium directly toward the exit port 76. Thus, the momentum of the quenching medium can be used to assist in clearing the exit port 76. In certain applications, it may not be necessary to reduce the reactor exit temperature sufficiently to re-dissolve any or all the salt particles.

Figure 3:
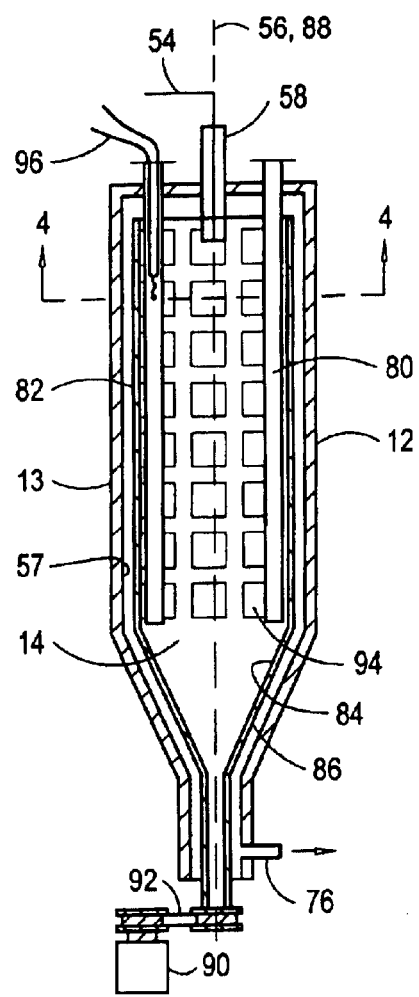
FIG. 3 is a schematic cross-sectional representation for an embodiment of the present invention having a scraper formed with holes and scraper bars that are fixed relative to the reactor vessel.
Figure 4A:
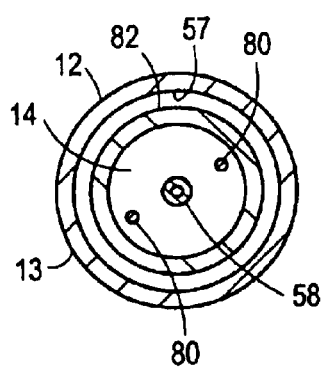
FIG. 4A is a schematic cross-sectional representation of a reactor as seen along line 4—4 in FIG. 3 for an embodiment of the present invention having round scraper bars.

Importantly for the present invention, a scraper bar 80 can be partially or fully disposed within the reactor vessel 12. FIG. 2 shows an elongated scraper bar 80 positioned adjacent to a hollow cylindrical scraper 82 in a representative downflow reactor vessel 12. The structural cooperation between the reactor vessel 12, the scraper bar 80 and the scraper 82 can be best understood by cross-referencing FIGS. 3 and 4A. As shown, the reactor vessel 12 is generally shaped as an elongated cylinder formed with a wall 13 having an inner surface 57. Further, the reactor vessel 12 surrounds a reactor chamber 14 and defines a longitudinal axis 56. A rotatable scraper 82 is positioned in the reactor chamber 14. The scraper 82 is shaped as a hollow cylinder and is formed with an inside surface 84 and an outside surface 86 and defines a scraper axis 88. The scraper 82 is positioned in the reactor chamber 14 with the outside surface 86 of the scraper 82 adjacent to the inner surface 57 of the reactor vessel 12 and the scraper axis 88 co-linear with the longitudinal axis 56 of the reactor vessel 12. A mechanism is included for rotating the scraper 82 about the longitudinal axis 56. As shown in FIG. 3, the mechanism can include a motor 90 that drives a belt 92 attached to the scraper 82. Further, the scraper 82 can be formed with holes 94 that extend from the inside surface 84 to the outside surface 86 of the scraper 82.

Figure 4B:
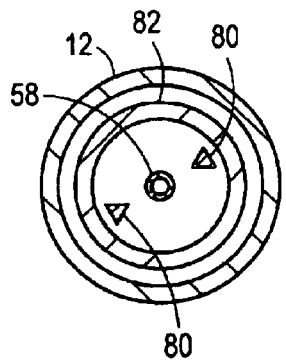
FIG. 4B is a schematic cross-sectional representation as in FIG. 4A for an embodiment of the present invention having triangular scraper bars.
Figure 4C:
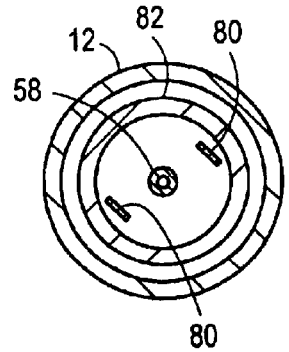
FIG. 4C is a schematic cross-sectional representation as in FIG. 4A for an embodiment of the present invention having blade shaped scraper bars.

As shown in FIG. 3, a plurality of scraper bars 80 can be positioned adjacent to the inside surface 84 of the scraper 82. Although two scraper bars 80 are shown in FIG. 3, it is to be appreciated that any number of scraper bars 80 can be used in the present invention. FIG. 3 further shows that the scraper bars 80 are generally elongated in the direction of the longitudinal axis 56 of the reactor vessel 12. By cross-referencing FIGS. 3 and 4A, it can be seen that the scraper bars 80 can have a rounded or circular shape normal to the direction of elongation. Similarly, in alternative embodiments of the present invention, the scraper bars 80 can have a triangular shape (FIG. 4B) or a bladed shape (FIG. 4C) normal to the direction of elongation of the scraper bar 80. In the embodiment of the present invention as shown in FIG. 3, the scraper bars 80 are held stationary with respect to the reactor vessel 12. For the present invention, the scraper bar 80 can be used to house a thermocouple 96 for use in determining the temperature of the reactor chamber 14.

In another embodiment of the present invention as shown in FIG. 5, the scraper bar 80 can be rotated about a scraper bar axis 98 to prevent the accumulation of inorganic solids on the scraper bar 80. For the present invention, the scraper bar axis 98 passes through the scraper bar 80 and is substantially parallel to the longitudinal axis 56 of the reactor vessel 12. A mechanism is provided to rotate the scraper bar 80 about the scraper bar axis 98. As shown in FIG. 5, the mechanism can include a motor 100 that drives a belt 102 attached to the scraper bar 80. In the embodiment of the present invention shown in FIG. 5, a scraper 82 is also rotated about the longitudinal axis 56 of the reactor vessel 12.

In yet another embodiment of the present invention as shown in FIG. 6, the scraper bar 80 can include internal cooling channel(s) 104 to maintain the temperature of the scraper bar 80 and the fluid 106 immediately surrounding the scraper bar 80. As shown in FIG. 6, a coolant source 108 which may contain a cooling fluid such as water or any suitable coolant known in the pertinent art is placed in fluid communication with the internal cooling channel 104. During operation, a pump (not shown) can transfer coolant from the coolant source 108 through the internal coolant channel(s) 104 to cool the scraper bar 80. In the embodiment of the present invention shown in FIG. 6, the scraper bar 80 is held stationary with respect to the reactor vessel 12, and a scraper 82 is rotated about the longitudinal axis 56 of the reactor vessel 12.

Figure 7:
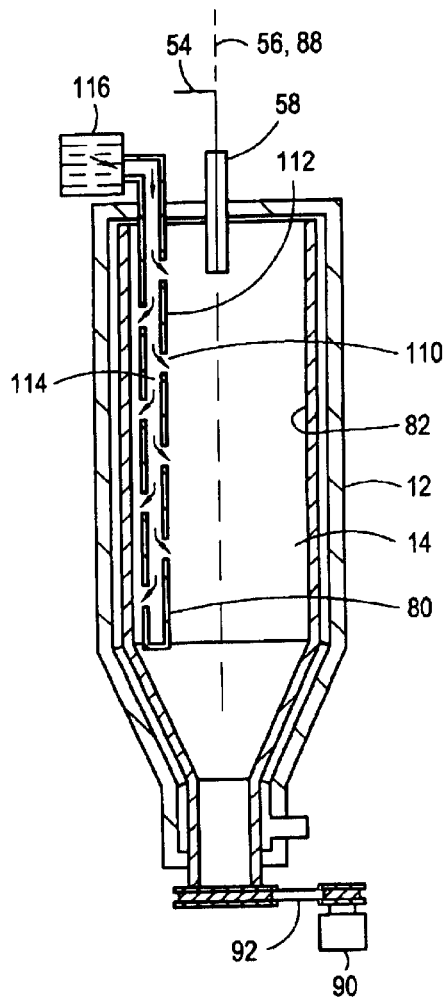
FIG. 7 is a schematic cross-sectional representation for an embodiment of the present invention having a scraper bar formed with purge holes.

In another embodiment of the present invention as shown in FIG. 7, the scraper bar 80 can include purge holes 110 on the exterior surface 112 of the scraper bar 80. Internal fluid channels 114 are formed in the scraper bar 80 in fluid communication with the purge holes 110. A purging fluid source 116 is provided in fluid communication with the internal fluid channels 114. During operation, a pump (not shown) can transfer a purging fluid from the purging fluid source 116 through the internal fluid channel(s) 114 for release through the purge holes 110 into the reactor chamber 14. Preferably, the purge holes 110 are configured to release the purging fluid into the reactor chamber 14 in a manner to which creates a jacket of purging fluid surrounding the scraper bar 80. The purging fluid can be air, nitrogen, water or any other purging fluid known in the pertinent art. For example, at subcritical temperatures, inorganics have a relatively high solubility in water. When water at subcritical temperatures is used as a purging fluid and released near the exterior surface 112 of the scraper bar 80, solid inorganics in the reactor chamber 14 will dissolve in the purging fluid rather than accumulate on the scraper bar 80. When air or nitrogen is used, solid inorganics in the reactor chamber 14 are pushed away from the scraper bar 80 and are unable to accumulate on the scraper bar 80. In the embodiment of the present invention shown in FIG. 7, the scraper bar 80 is held stationary relative to the reactor vessel 12, and a scraper 82 is rotated about the longitudinal axis 56 of the reactor vessel 12.

Figure 8:
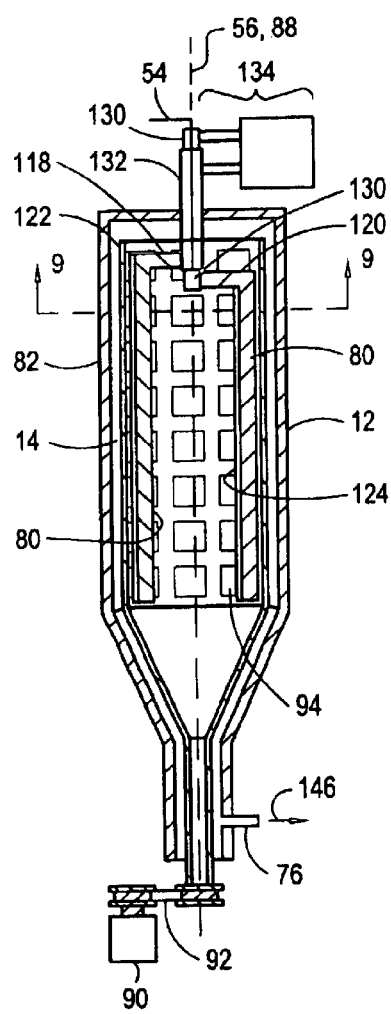
FIG. 8 is a schematic cross-sectional representation for an embodiment of the present invention having a scraper and nesting scraper bars.
Figure 9A:
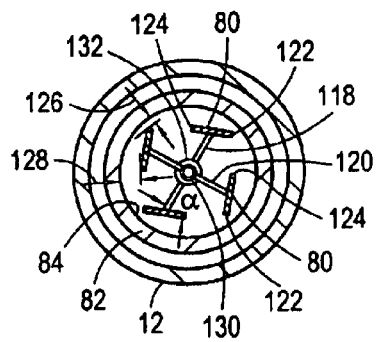
FIG. 9A is a schematic cross-sectional representation of a reactor as seen along line 9—9 in FIG. 8 for an embodiment of the present invention showing the nesting scraper bars in the scraping configuration.
Figure 9B:
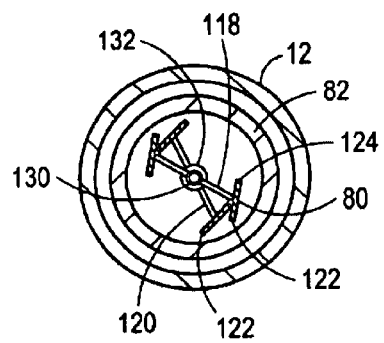
FIG. 9B is a schematic cross-sectional representation as in FIG. 9A showing the nesting scraper bars in the nested configuration.

In another embodiment of the present invention, nesting scraper bars 80 (as described further below) are used to prevent solids buildup on the scraper bars 80. The structure and cooperation of structure for a plurality of nesting scraper bars 80 can best be appreciated by cross-referencing FIGS. 8, 9A and 9B. As shown in FIG. 8, scraper bars 80 that are elongated in the direction of the longitudinal axis 56 of the reactor vessel 12 are positioned in the reactor chamber 14. For purposes of illustration, an embodiment having two nesting scraper bars 80 is shown in FIG. 8, and an embodiment having four nesting scraper bars 80 is shown in FIGS. 9A and 9B. Arms 118, 120 that extend radially from the longitudinal axis 56 to each scrapper bar 80 are provided to rotate the scraper bars 80 about the longitudinal axis 56 of the reactor vessel 12. As shown in FIG. 9A, each nesting scraper bar 80 is formed with a leading edge 122 and a trailing edge 124. Preferably, as shown in FIGS. 8, 9A and 9B, each scraper bar 80 is attached to an arm 118, 120 and oriented to form an angle, a, between the arm 118, 120 and the scrapper bar 80. This orientation results in the distance 126 between the leading edge 122 of the scraper bar 80 and the inside surface 84 of the scraper 82 being less than the distance 128 between the trailing edge 124 of the scraper bar 80 and the inside surface 84 of the scraper 82. During operation of the system 11, the scraper bars 80 are movable between a scraping configuration (FIG. 9A) for removing solids from the scraper 82 and a nested configuration (FIG. 9B) for removing any solids that have accumulated on the scraper bars 80. As shown in FIG. 9A, in the scraping configuration, the scraper bars 80 are preferably spaced apart from each other and are held stationary relative to the reactor vessel 12. In this embodiment, a relative movement between the scraper 82 and the scraper bars 80 is achieved by rotating the scraper 82 about the longitudinal axis 56 of the reactor vessel 12, while holding the scraper bars 80 stationary relative to the reactor vessel 12. Preferably, the rotation of the scraper 82 causes each point on the scraper 82 to first pass by the leading edge 122 followed by the trailing edge 124. In the nested configuration shown in FIG. 9B, each scraper bar 80 is juxtaposed with one other scraper bar 80. In passing from the scraping configuration to the nesting configuration, the leading edge 122 of each scraper bar 80 passes by the trailing edge 124 of an adjacent scraper bar 80 to scrape any solids that have accumulated on both scraper bars 80.

A mechanism for reconfiguring the scraper bars 80 between the nested configuration and the scraping configuration is shown in FIGS. 8, 9A and 9B. It is to be appreciated that any methods known in the pertinent art for moving one scraper bar 80 relative to another scraper bar 80 about a longitudinal axis 56 can be used. As shown in FIG. 8, an inner shaft 130 can be positioned within an outer shaft 132. One or more scraper bars 80 can be attached using arm(s) 118 to the outer shaft 132, and one or more scraper bars 80 can be attached using arm(s) 120 to the inner shaft 130. Further, a mechanism 134 can be provided to rotate the outer shaft 132 relative to the inner shaft 130, thereby reconfiguring the scraper bars 80 between the scraping configuration and the nested configuration.

Figure 10:
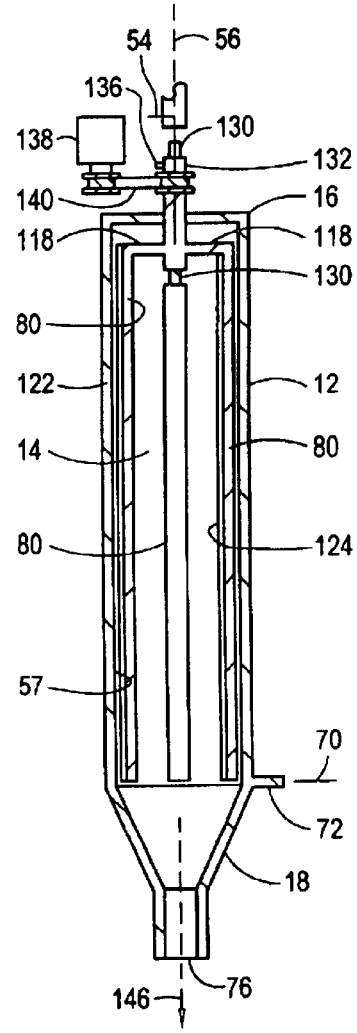
FIG. 10 is a schematic cross-sectional representation for an embodiment of the present invention having nesting, rotatable scraper bars.

In another embodiment of the present invention, nesting scraper bars 80 can be used without a scraper 82. The structure and cooperation of structure for a plurality of nesting scraper bars 80 without a scraper 82 is shown in FIG. 10. The embodiment shown in FIG. 10 is similar to the embodiment shown in FIG. 8, but differs slightly. Specifically, the embodiment shown in FIG. 10 does not include a scraper 82 and consequently a mechanism is provided to rotate the plurality of scraper bars 80 about the longitudinal axis 56. As shown in FIG. 10, the scraper bars 80 are positioned adjacent to the inner surface 57 of the reactor vessel 12. Each scraper bar 80 is attached to either an inner shaft 130 or an outer shaft 132. The inner shaft 130 is positioned within the outer shaft 132, and both shafts 130, 132 are centered for rotation about the longitudinal axis 56 of the reactor vessel 12. A pin 136 is provided to lock the shafts 130, 132 together, thereby allowing the scraper bars 80 to be rotated as a group about the longitudinal axis 56 of the reactor vessel 12. For this purpose, a motor 138 may be provided to drive a belt 140 which in turn rotates the shafts 130, 132 about the longitudinal axis 56. Periodically, the pin 136 can be removed allowing the inner shaft 130 to be rotated relative to the outer shaft 132 to reconfigure the scraper bars 80 between a scraping configuration and a nested configuration.

Returning now to FIG. 1, it will be seen that as the reaction stream 60 is removed from the vessel 12 it is passed through the line 77 to a cooler 142. As contemplated for system 11, the cooler 142 may use regenerative heat exchange with cool reactor stream, or heat exchange with ambient or pressurized air, or a separate water supply such as from a steam generator (not shown). Once cooled by the cooler 142, the high pressure reactor stream is then depressurized. Preferably, depressurization is accomplished using a capillary 144. It will be appreciated, however, that a pressure control valve or orifice (not shown) can be used in lieu of, or in addition to, the capillary 144.

After the effluent 146 from the reactor chamber 14 has been both cooled by the cooler 142 and depressurized by capillary 144, it can be sampled through the line 148. Otherwise, the effluent 146 is passed through the line 150 and into the liquid-gas separator 152. To allow accumulation of a representative sample in separator 152, it can be diverted to either tank 154 during startup of the system 11, or to tank 156 during the shutdown of system 11. During normal operation of the system 11, the line 158 and valve 160 can be used to draw off liquid 162 from the collected effluent 146. Additionally, gas 164 from the headspace of separator 152 can be withdrawn through the line 166 and sampled, if desired, from the line 168. Alternatively, the gas 164 can be passed through the filter 170 and valve 172 for release as a nontoxic gas 174 into the atmosphere. As will be appreciated by the person of ordinary skill in the pertinent art, a supply tank 176 filled with an alkali neutralizing agent 178 can be used and the agent 178 introduced into the separator 152 via line 180 to counteract any acids that may be present.

The following is an example of results that are attainable by the system 10:

An 8 wt % $NaHCO_3$ feed was fed to a four inch internal diameter downflow reactor with a scraper but no scraper bar. The reactor plugged with salts 45 minutes after start of the salt solution feed. A scraper bar was inserted into the reactor and the test was repeated with the same solution and feed rates. The salt solution was fed 3 hours and 40 minutes without plugging of the reactor.

While the particular System And Method For Solids Transport In Hydrothermal Processes as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. An apparatus for hydrothermally treating a reactant wherein the treatment produces solids, said apparatus comprising:

a substantially cylindrical reactor vessel surrounding a reactor chamber, said vessel having a longitudinal axis;

a scraper formed as a hollow cylinder having an inside surface, an outside surface and a scraper axis, said scraper being disposed in said reactor chamber with said scraper axis of said scraper substantially co-linear with said longitudinal axis of said reactor vessel;

an elongated scraper bar, at least a portion of said scraper bar being disposed within said reactor vessel, aligned substantially parallel to said longitudinal axis and offset therefrom for interaction with said inside surface of said scraper; and means for rotating said scraper about said scraper axis for movement relative to said scraper bar to remove the solids from said scraper.

2. An apparatus as recited in claim 1 further comprising a means for holding said scraper bar stationary relative to said reactor vessel.

3. An apparatus as recited in claim 1 further comprising a plurality of scraper bars and wherein at least a portion of four said scraper bars are positioned inside said reactor chamber.

4. An apparatus as recited in claim 1 wherein said scraper bar defines a scraper bar axis, said scraper bar axis being substantially parallel to said longitudinal axis of said reactor vessel, and wherein said apparatus further comprises a means for rotating said scraper bar about said scraper bar axis.

5. An apparatus as recited in claim 1 wherein said scraper bar is formed with a first edge and a second edge, and wherein said scraper bar is positioned within said reactor vessel with said first edge positioned at a first distance from said inside surface of said scraper and said second edge positioned at a second distance from said inside surface.

6. An apparatus as recited in claim 5 wherein said first distance is larger than said second distance.

7. An apparatus as recited in claim 6 wherein said scraper bar is a first scraper bar and said apparatus further comprises:

a second scraper bar having a first edge and a second edge, said second scraper bar positioned within said reactor vessel with said first edge positioned at substantially said first distance from said inside surface and said second edge positioned at substantially said second distance from said inside surface; and means for rotating said second scraper bar about said longitudinal axis, said means allowing for rotation of said second scraper bar independent of said first scraper bar rotation to allow relative movement between said first and second scraper bars.

8. An apparatus as recited in claim 1 wherein said scraper is formed with holes extending from said inside surface of said scraper to said outside surface of said scraper.

9. An apparatus as recited in claim 1 further comprising a fluid source, and wherein said scraper bar has an exterior surface and is formed with at least one purge hole located on said exterior surface, said scraper bar being formed with at least one internal fluid channel; for fluid communication therethrough for passing a purging fluid from said purging fluid source to said purge hole for release into said reactor chamber.

10. An apparatus as recited in claim 1 wherein said scraper bar is formed with at least one internal coolant channel for allowing a cooling fluid to be internally circulated through said scraper bar.

11. An apparatus for hydrothermally treating a reactant wherein the treatment produces solids, said apparatus comprising:

a substantially cylindrical reactor vessel formed with an inner surface and having a longitudinal axis;

a scraper bar having a first edge and a second edge, said scraper bar being disposed in said reactor vessel with said first edge positioned at a first distance from said inner surface and said second edge positioned at a second distance from said inner surface wherein said first distance is larger than said second distance;

an arm attached to said scraper bar between said first edge and said second edge; and means coupled to said arm for rotating said scraper bar about said longitudinal axis and over said inner wall to remove solids from said inner surface.

12. An apparatus as recited in claim 11 wherein said scraper bar is a first scraper bar and said apparatus further comprises:

a second scraper bar having a first edge and a second edge, said second scraper bar being disposed in said reactor vessel with said first edge positioned at substantially said first distance from said inner surface and said second edge positioned at substantially said second distance from said inner surface; and means for rotating said second scraper bar about said longitudinal axis, said means allowing for rotation of said second scraper bar independent of said first scraper bar to allow relative movement between said first and second scraper bars.

* * * * *

UNITED STATES PATENT AND TRADEMARK OFFICE
CERTIFICATE OF CORRECTION

PATENT NO. : 6,773,581 B2
DATED : August 10, 2004
INVENTOR(S) : David A. Hazlebeck et al.

It is certified that error appears in the above-identified patent and that said Letters Patent is hereby corrected as shown below:

Column 11,
Line 32, delete "a," insert -- α --

Signed and Sealed this

Twenty-first Day of December, 2004

JON W. DUDAS
*Director of the United States Patent and Trademark Office*